United States Patent
Denison et al.

[15] 3,662,763
[45] May 16, 1972

[54] COMBINE

[72] Inventors: Henry Hoyt Denison, Moline, Ill.; Roy Edwards Harrington, New Delhi, India

[73] Assignee: Deere & Company, Moline, Ill.

[22] Filed: July 22, 1970

[21] Appl. No.: 57,234

[52] U.S. Cl. ..........................................................130/27 P
[51] Int. Cl. ..........................................................A01f 12/20
[58] Field of Search ......................................130/27 R, 27 P

[56] References Cited

UNITED STATES PATENTS 3,011,497  12/1961  Larsson et al. ...........................130/27 P

FOREIGN PATENTS OR APPLICATIONS 934,229  5/1948  France ....................................130/27 P
177,587  7/1953  Austria ...................................130/27 P Primary Examiner—Antonio F. Guida
Attorney—H. Vincent Harsha, Harold M. Knoth, William A. Murray, Raymond L. Hollister and John M. Nolan

[57] ABSTRACT

A self-propelled combine having a rotary separating mechanism mounted forwardly thereon including a threshing cylinder and associated closed concave which initially thresh the crop, and a series of three separating impellers and associated open concaves which cooperate to move the threshed crop along a serpentine path while separating the grain from the straw. The grain is collected from each of the open concaves and delivered first to a rotary cleaning mechanism mounted on the extreme rear of the combine, then to a clean grain storage tank mounted on the combine frame intermediate the separating and cleaning mechanisms. The concave associated with the threshing cylinder is constructed as an integral part of the combine header and is swingable therewith about the cylinder axis of rotation. The header is mounted on an eccentric on the axis such that the cylinder-concave spacing can be adjusted by rotating the eccentric.

9 Claims, 7 Drawing Figures

Patented May 16, 1972

INVENTORS
H. HOYT DENISON
ROY E. HARRINGTON

Patented May 16, 1972

INVENTORS
H. HOYT DENISON
ROY E. HARRINGTON

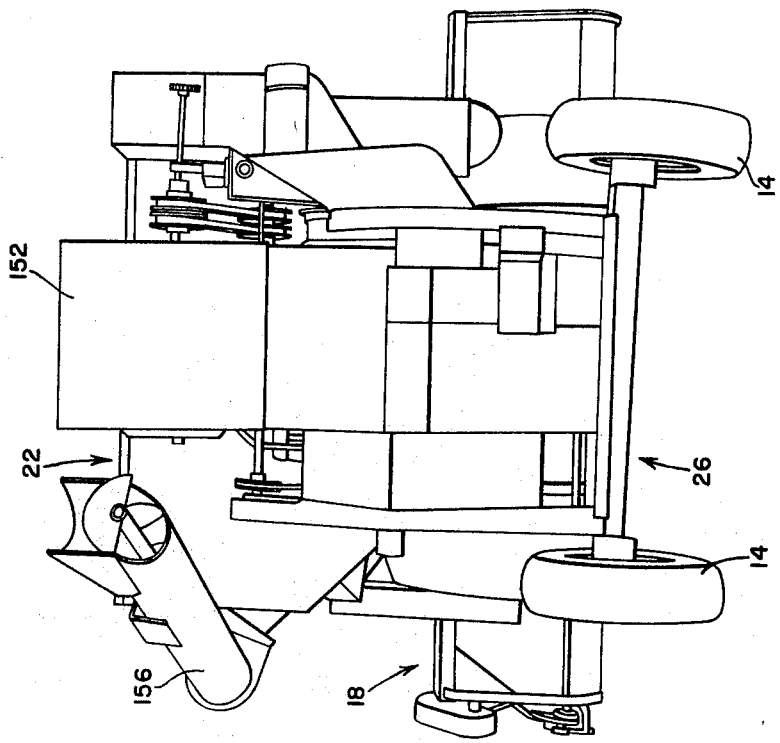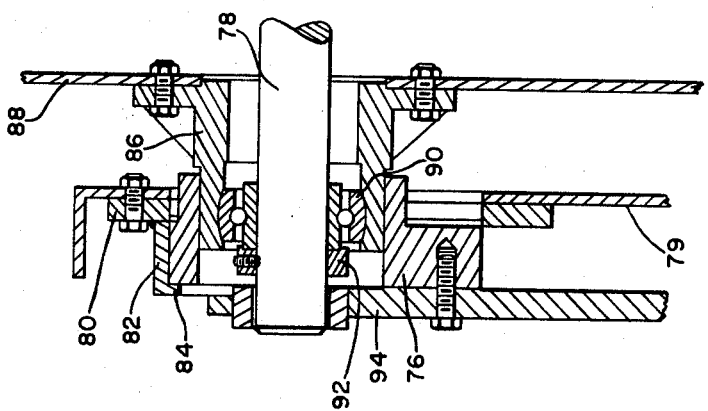

INVENTORS
H. HOYT DENISON
ROY E. HARRINGTON

INVENTORS
H. HOYT DENISON
ROY E. HARRINGTON

Patented May 16, 1972

INVENTORS
H. HOYT DENISON
ROY E. HARRINGTON

COMBINE

BACKGROUND OF THE INVENTION

The present invention relates generally to combines, and more particularly to a combine having a rotary separating system.

A combine separating system of conventional design includes a single, forwardly mounted threshing cylinder, and a bank of strawwalkers extending rearwardly from the cylinder to the rear of the combine. The cylinder generally operates in conjunction with an open grate or concave such that a portion of the threshed grain is separated from the straw as it passes therebetween, while the grain remaining in the straw is separated out as the crop is advanced rearwardly by the strawwalkers. Fore-and-aft rotary crank arms impart a combined reciprocating and rotary motion to the walkers, such that the crop is thrown upwardly and rearwardly with each rotation of the arms until it eventually is discharged to the ground at the rear of the walkers. The floors of the walkers are perforated to allow the grain to fall therethrough. An air blast cleaning mechanism located beneath the strawwalkers removes the chaff from the grain, and the cleaned grain is then elevated to a storage tank generally positioned above the forward portion of the strawwalkers.

A number of disadvantages are inherent in this conventional design. For example, since gravity plays a major part in their operation, the efficiency of the strawwalkers is reduced considerably when the combine is operated on a slope, due to the tendency of the crop to bunch up on their downhill side. In addition, the opposed reciprocating motion of the walkers generates a considerable vibration in the machine and necessitates a heavier construction than would otherwise be required. Finally, since the strawwalkers conventionally extend through the entire area between the threshing cylinder and the rear end of the combine, the grain tank and often the engine have been mounted over the strawwalkers at a substantial elevation, resulting in an undesirably high silhouette and center of gravity.

SUMMARY OF THE INVENTION

It is, accordingly, a primary object of the present invention to provide a combine with separating capabilities which are unaffected by the slope of the terrain on which it operates. It is another object to provide a combine with substantially fewer reciprocating elements, and resulting undesirable vibrations, than combines of conventional design. It is yet another object to provide a compact combine with an extremely low center of gravity and substantially lower silhouette than that possessed by conventional combines.

In furtherance of these and other objects, the combine of the present invention includes a rotary separating system utilizing a plurality of separating impellers in place of the conventional reciprocating strawwalkers. Impellers of the type utilized permit a positive, continuous control of the crop during the separation process, thereby substantially eliminating the adverse effects of gravity inherent in the conventional strawwalker separating operation. More particularly, the separating system comprises a threshing cylinder operating in conjunction with a closed concave, a first separating impeller and open concave positioned above the threshing cylinder, a second impeller and open concave positioned behind the first impeller, and a third impeller and open concave positioned above the second impeller. The first impeller rotates in a direction opposite that of the cylinder, while the remaining two impellers rotate in directions opposite that of their immediately preceding impellers. The crop is thus fed tangentially from each unit to the next along a smooth serpentine path while the grain is separated therefrom. The last impeller in the series discharges the straw downwardly and rearwardly to the ground. The separated grain is collected from each of the open concaves and conveyed to a conventional rotary cleaner mounted on the rear of the combine frame, and the clean grain is stored in a tank mounted directly on the combine frame intermediate the separating and cleaning units.

Since the compact rotary separating system does not extend the entire length of the combine as do conventional strawwalkers, the grain tank, as well as the engine, can both be mounted directly on the combine frame, thus substantially lowering both the silhouette and center of gravity of the machine. Contributing further to the low silhouette and center of gravity is the unique threshing cylinder and header mounting arrangement of the invention. A closed, rather than open concave is utilized adjacent the threshing cylinder, obviating the need for a grain collecting device thereunder, and thus enabling the cylinder to be mounted low in the separator housing adjacent the header discharge area. The concave is constructed as an integral part of the feeder house and header, and is pivotable therewith about the axis of rotation of the threshing cylinder such that the angle of feed to the concave remains constant for all header elevations. The cylinder-concave spacing can be adjusted by rotating an eccentric which mounts the feeder house on the axis.

BRIEF DESCRIPTION OF THE DRAWINGS

The preferred embodiment of the invention will be described in conjunction with the accompanying drawings in which:

FIG. 3 is a rear perspective view of the combine;

FIG. 7 is a sectional view taken along the line 7—7 of FIG. 6.

DESCRIPTION OF THE PREFERRED EMBODIMENT

Figure 1:
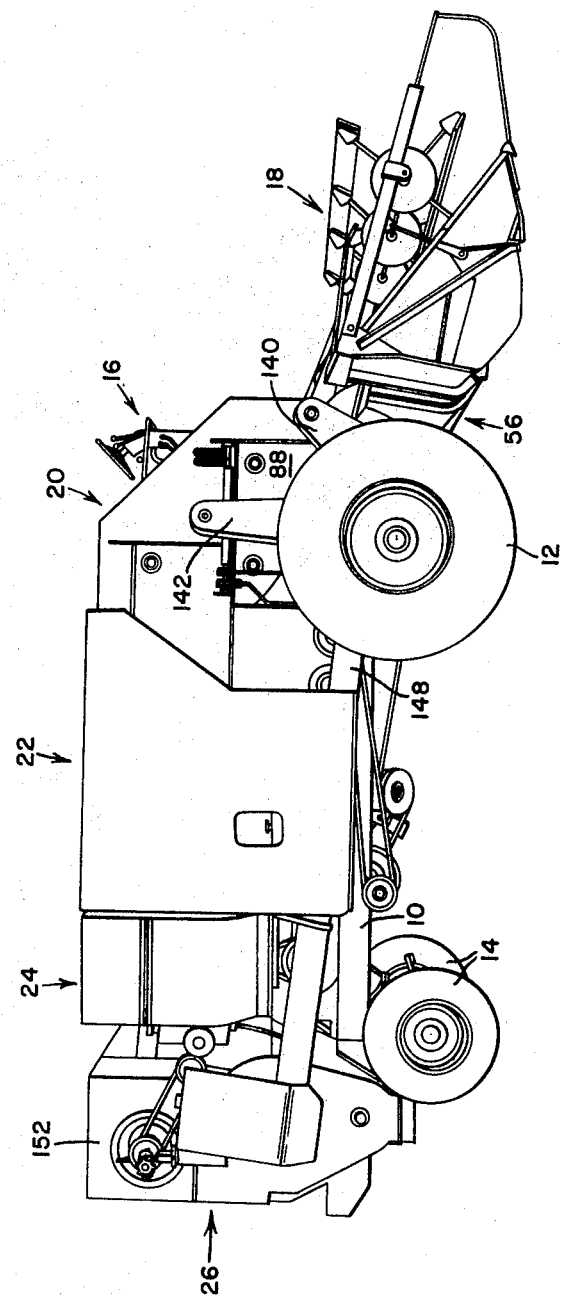
FIG. 1 is a side perspective view of the combine.

The combine illustrated is of the self-propelled type and includes, generally, a frame 10, a pair of front drive wheels 12, and rear steerable wheels 14, an operator's station 16 positioned directly over the left front drive wheel, and a forwardly extending header or grain platform 18 which operates to sever the crop from the field as the combine advances thereover and feed it rearwardly to the processing units carried by the frame. Proceeding from front to rear, the frame 10 supports a rotary separating mechanism contained within a housing 20, a clean grain storage tank 22, an internal combustion engine 24 for propelling the machine as well as powering the various operating components thereon, and a rotary cleaning unit 26 for removing the chaff and other debris from the grain.

The grain platform 18 is of more or less conventional design, and includes the usual reciprocating cutter 28 extending between a pair of generally triangular side walls 30 and 32. An upright rear wall 34 and a bottom surface 36 join the side walls 30 and 32 to form a trough-like structure for receiving the cut crop. A conventional reel 38, supported at its right and left ends on a pair of swingable arms 40 and 42, respectively, acts to feed the standing crop to the cutter 28. The inclination of the arms 40 and 42, and thus the height of the reel 38 relative to the main platform body, is adjustable by means of a hydraulic cylinder 44 acting between each of the arms and a bracket 46 on the side wall. A transverse auger 48 with opposite helical flights 50 and 52 on its right and left ends, respectively, operates in the trough formed by the walls 34 and 36 to feed the cut crop centrally. There, a set of circumferentially spaced retractable fingers 54 feed the crop rearwardly into a connecting feeder house 56 which communicates with the combine separating system and includes a further set of retractable fingers 58 for moving the crop thereto.

Figure 5:
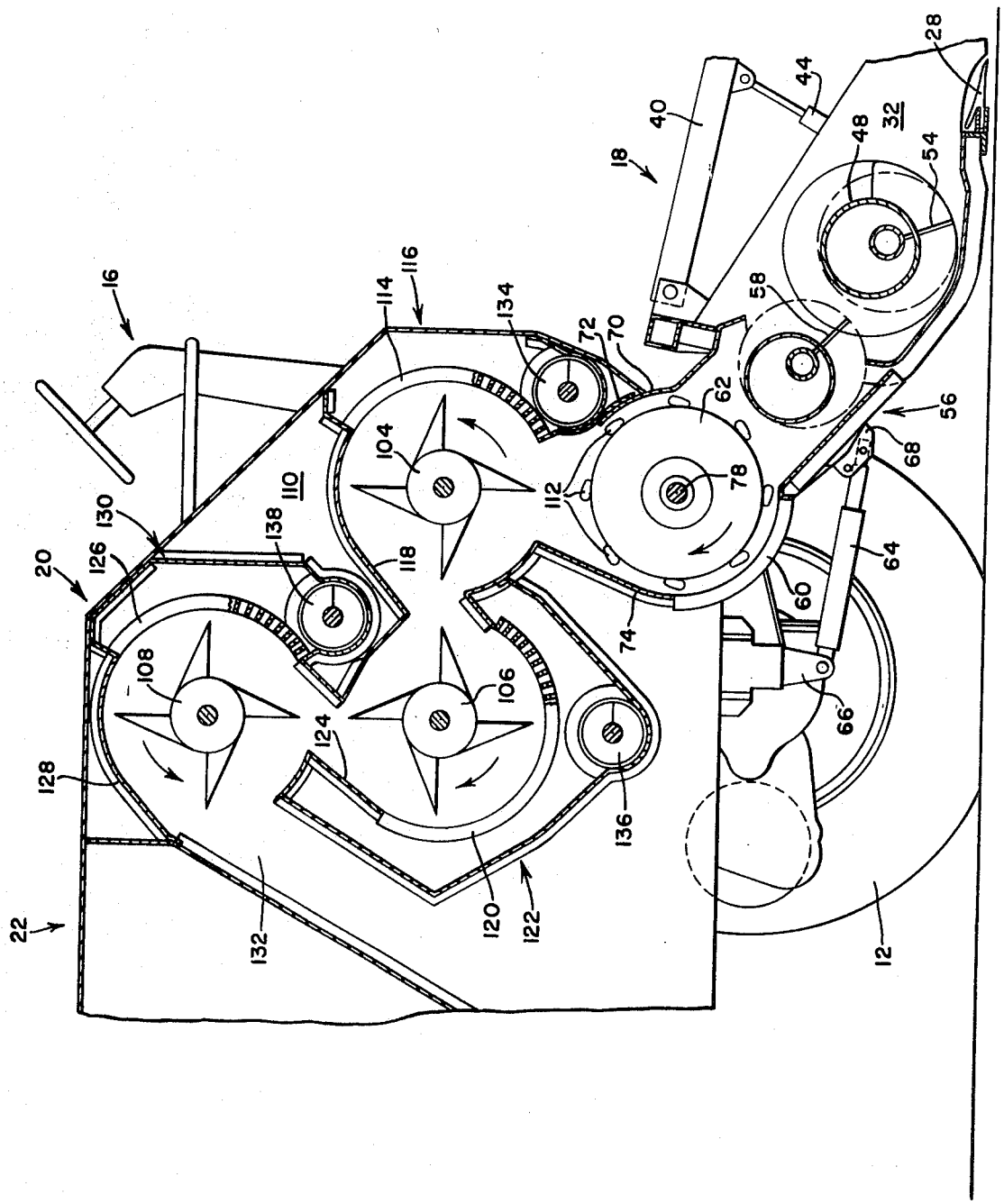
FIG. 5 is a vertical, sectional view of the rotary separating system, taken along the longitudinal center line of the machine.
Figure 6:
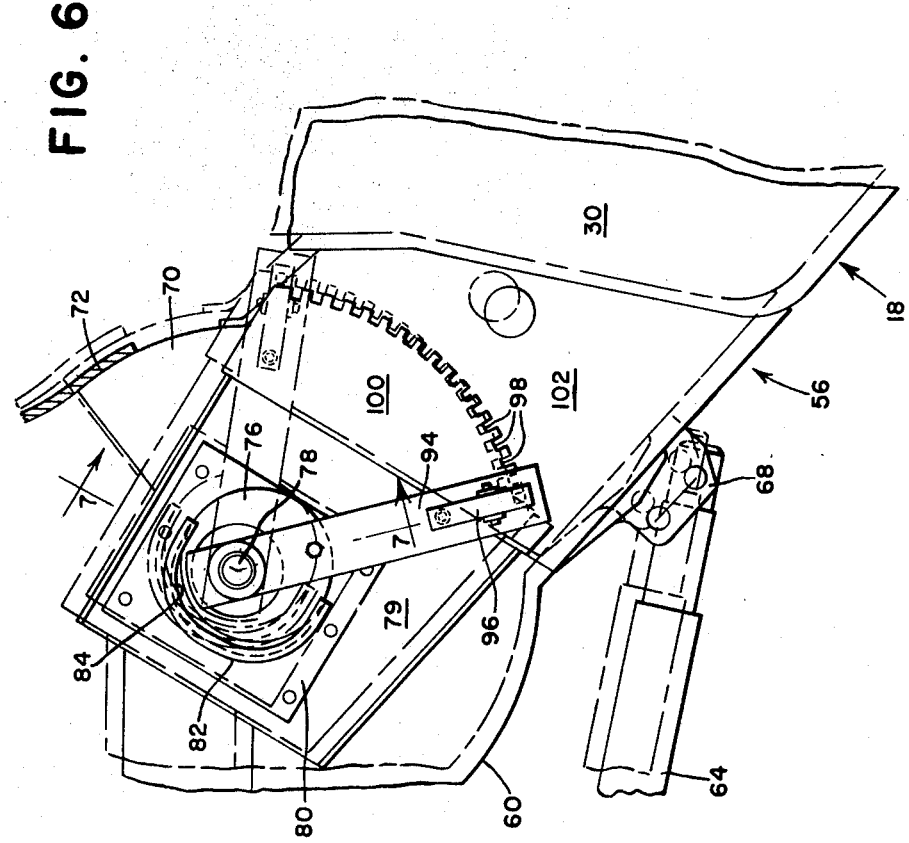
FIG. 6 is an enlarged partial side view illustrating the header mounting arrangement.

A significant feature of the invention resides in the construction of the feeder house 56, and in particular, the manner in which it is mounted on the separator housing 20, the details of this mounting being shown in FIGS. 5, 6 and 7. In general, the feeder house 56 includes as an integral part thereof, a closed concave 60 associated with a conventional threshing cylinder 62. The inclination of the feeder house, and thus the height of the attached platform 18, is adjustable by means of right and left hydraulic cylinders 64 (only one being shown), acting between brackets 66 and 68 on the undersides of the combine frame and feeder house, respectively. As this adjustment is effected, the concave 60 is necessarily moved relative to the cylinder 62. To provide for this relative movement without changing the relative positions of the two elements, the feeder house is pivoted about the axis of rotation of the cylinder. As a consequence, although the concave moves around the circumference of the cylinder as the position of the feeder house is changed, it nevertheless maintains the same position relative to the cylinder for every platform elevation, and the crop feeding angle between the feeder house and cylinder can thus be optimized for all elevations of the platform 18. As shown in FIGS. 5 and 6, an arcuate hood 70 is provided on the upper rear portion of the feeder house, the hood being so constructed that it overlaps the adjacent wall 72 of the separator housing 20 and forms a crop-tight seal therewith throughout the extremes of adjustment of the header 18. In a like manner, the rear terminal edge of the concave 60 overlaps and forms a continuous crop-tight seal with the arcuate surface of the adjacent guide member 74.

Adjustment of the concave-cylinder spacing, to accommodate a variety of crops and conditions, is accomplished by rotation of a pair of eccentrics 76 interposed between the feeder house 56 and threshing cylinder shaft 78. Referring to FIGS. 6 and 7 which illustrate the details of this construction, the feeder house 56 includes a pair of members 79 (only one being shown) which extend upwardly and rearwardly along opposite sides of the separator housing 20. Although only one side of the feeder house is shown, the opposite side is constructed in an identical manner, and it is to be understood that the following description applies equally to both. An apertured square plate 80 is fastened to each side member 79 and has a U-shaped retainer 82 welded to its outer surface. A lip 84 extending inwardly around the upper edge of the retainer prevents the eccentric 76 from moving axially outwardly with respect to the member 79. The eccentric, in turn, is rotatably mounted on a flanged, hollow cylindrical support 86 fastened to the separator housing side wall 88. A bearing 90 rotatably mounts the shaft 78 concentrically within the support 86, and a collar 92 restrains the shaft from axial movement.

It will be apparent from the structure described that when the eccentric 76 is rotated about the support 86, the position of the concave 60 relative to the cylinder 62 will change accordingly. Rotation of the eccentric 76 is accomplished by means of an arm 94 fixed to the outer surface of the eccentric and extending downwardly and forwardly therefrom, as viewed in FIG. 6. A latch mechanism 96 on the outer end of the arm 94 is adapted to releasably engage any of a series of indentations 98 formed on the forward arcuate edge of a plate 100 fixed to the feeder house wall 102. The range of adjustment of the cylinder-concave spacing is defined by the extreme upper and lower indentions on the plate 100, the spacing being at its maximum when the arm 94 is at the lower extreme of its travel, shown in solid lines in FIG. 6, and conversely, at its minimum when the arm is at the upper extreme of travel, shown in phantom in FIG. 6.

Figure 4:
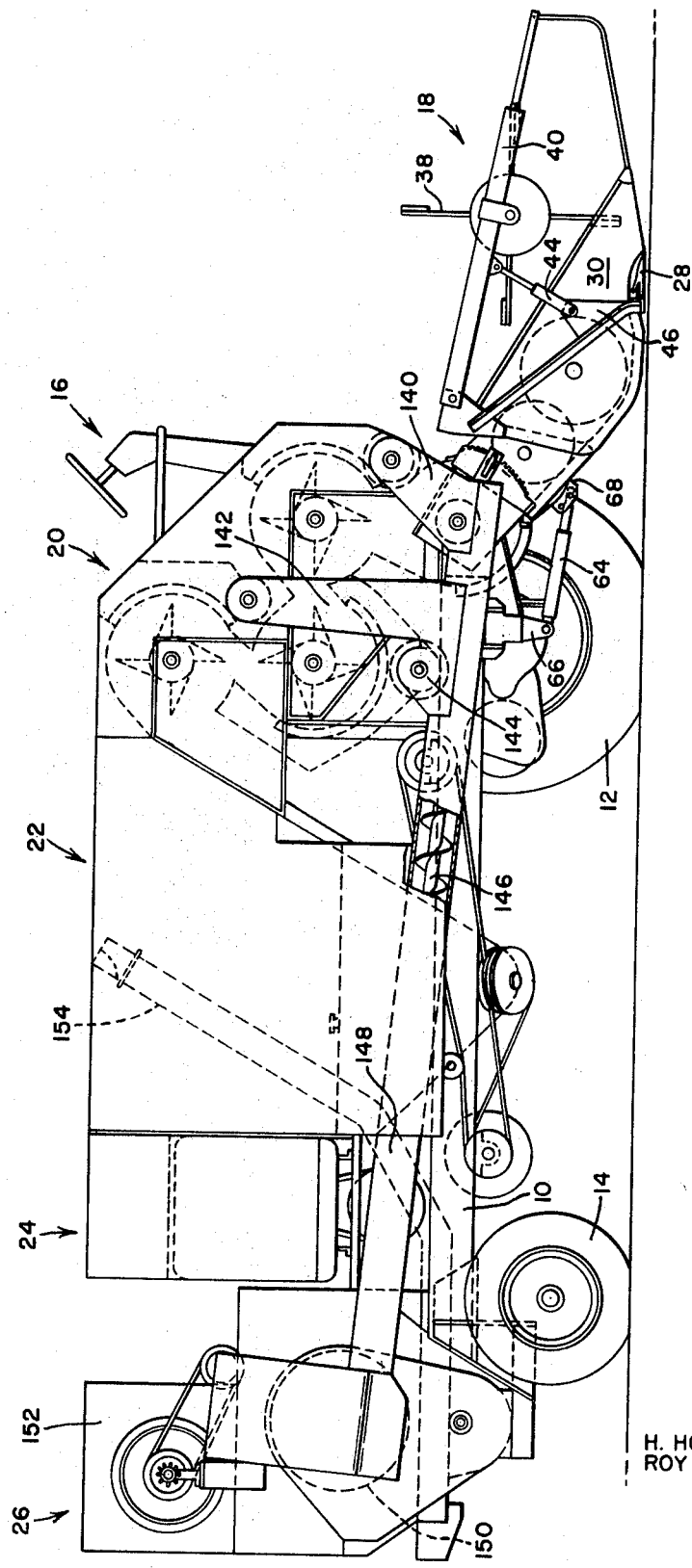
FIG. 4 is a somewhat schematic, side elevation view of the combine.

Referring now to FIGS. 4 and 5, the separating system of the combine includes, in addition to the threshing cylinder 62 and concave 60, a series of three separating impellers 104, 106, and 108, rotatably mounted between the side walls 88 and 110 of the housing 20. A plurality of conventional rasp bar elements 112, spaced equally about the circumference of the cylinder 62, initially advance the crop received from the feeder house 56 rearwardly and upwardly across the adjacent concave 60, thus dislodging the grain from the straw. The guide member 74 extending tangentially from the end of the concave directs the threshed crop upwardly and slightly forwardly from the threshing unit to the first separating unit positioned directly above the cylinder. There, the crop is picked up by the separating impeller 104 and moved counter-clockwise as indicated by the arrow in FIG. 5 across an adjacent open concave 114. A large portion of the loose grain is discharged through the concave 114 to the associated collecting chamber 116, while the remaining crop is moved on along the arcuate and tangential path defined by a guide member 118, thence discharged downwardly and rearwardly into the second separating unit. The separating impeller 106 in the second unit engages the crop and moves it across an adjacent open concave 120 where the majority of the grain remaining is discharged into an associated collecting chamber 122. The remaining crop, consisting principally of straw, is directed upwardly and forwardly by a guide member 124 to the third separating unit, where it is carried counterclockwise by the impeller 108 across an adjacent open concave 126, thence rearwardly and downwardly along a depending guide member 128. The last of the grain is thus deposited in a chamber 130 while the remaining straw is discharged through a passageway 132 directly to the ground. While in the illustrated embodiment of the separating system the several impellers are arranged in exact vertical or horizontal alignment with the immediately preceding unit, it is to be understood that this arrangement can be altered somewhat without departing from the scope of the invention as defined in the appended claims.

It will be noted that the flow of threshed material through the separating system is such that alternate sides of the mat of material are exposed to the open concave in successive separating units. The grain is thus removed from one side of the mat in the first unit, from the opposite side in the second unit, and again from the original side in the final unit. In addition, since the impellers 104, 106 and 108 move the crop in a positive and continuous manner, the adverse effects of gravity associated with the operation of conventional strawwalkers are substantially eliminated by the separating system of the invention. The separating capabilities of the combine are thus unaffected by the slope on which it is operated.

The grain collecting chambers 116, 122, and 130 have transverse auger conveyors 134, 136, and 138, respectively, journaled in their lower portions to remove the grain collected therein. The augers 134, 136, and 138 communicate, respectively, with delivery chutes 140, 142, and 144 spaced outwardly from the separator housing sidewall 88, and they, in turn, each communicate downwardly with a fore-and-aft auger 146. The auger 146 delivers the grain through a tube 148 to the cleaning unit 26 at the extreme rear of the combine.

Figure 2:
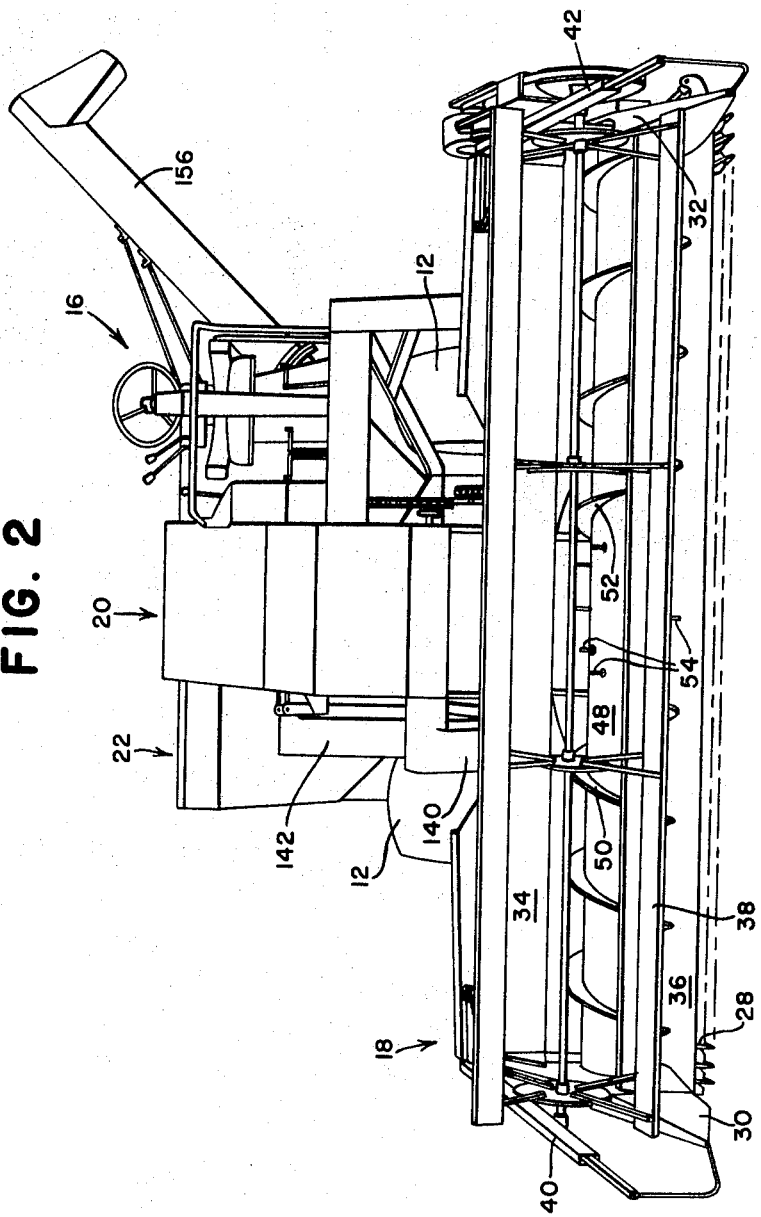
FIG. 2 is a front perspective view of the combine.

The construction of the particular cleaning unit illustrated is not material to the invention and thus will not be described in detail. Any of several types of cleaners could be utilized, one such type being that disclosed in U.S. Pat. No. 3,122,499 issued Feb. 25, 1964 to Witzel. In general, the cleaning unit illustrated comprises a transversely elongated cylindrical drum 150, a high speed rotor (not shown) within the drum, and a fan or blower 152. The grain in the auger tube 148 is deposited in one end of the stationary drum 150 and is advanced axially therethrough by the rotor which moves it along helical flighting on the inner surface of the drum. As the grain advances, a strong current of air created by the fan 152 blows the light chaff and trash through a fine grate comprising the lower surface of the drum. The clean grain is deposited in an auger conveyor 154, at the opposite end of the drum, and the auger 154, in turn, delivers it forwardly and upwardly to the grain storage tank 22. As previously noted, the storage tank 22 is mounted low on the combine, directly on the frame 10. An unloading auger 156 operates to empty the grain in a conventional manner from the tank 22 into a wagon or other receptacle alongside the machine, the auger 156 being shown in its operative, unloading position and its folded, transport position in FIGS. 2 and 3 respectively.

We claim:

1. A combine having a frame; separating means mounted forwardly on the frame and including a rotatably mounted threshing cylinder and at least one separating impeller for moving the threshed material along an arcuate path, said path including an open concave for effecting separation of grain from the material as it is moved therealong; header means mounted on said separating means for pivotal movement about the axis of rotation of said threshing cylinder; and a closed concave adjacent said threshing cylinder for cooperation therewith, said concave being integral with said header means.

2. The invention defined in claim 1 and further including extensible and retractable means acting between the frame and the header means for effecting pivotal movement of the latter about the cylinder axis, and thereby adjusting the height of said header means relative to the ground.

3. The invention defined in claim 1 and further including means for adjusting the spacing between the threshing cylinder and the closed concave.

4. The invention defined in claim 3 wherein said adjusting means comprises eccentric means mounting the header means on the cylinder axis, and means for rotating the eccentric means about the cylinder axis independently of said header means.

5. The invention defined in claim 4 and further including means for releasably holding said eccentric means relative to said header means.

6. A combine having a ground wheel supported frame; separating means mounted on the frame and including a rotatably mounted threshing cylinder; header means mounted for pivotal movement about the axis of rotation of said threshing cylinder; a concave positioned adjacent said threshing cylinder for cooperation therewith, said concave being integral with said header means; and means for adjusting the spacing between the cylinder and concave, said means comprising: eccentric means mounting the header means on the cylinder axis, and means for rotating the eccentric means about the cylinder axis independently of said header means.

7. The invention defined in claim 6 and further including extensible and retractable means acting between the frame and the header means for effecting pivotal movement of the latter about the cylinder axis.

8. The invention defined in claim 6 and further including means for releasably holding said eccentric means relative to said header means.

9. A separating system for a combine comprising: a pair of spaced support means; a threshing unit mounted between said support means and including a rotatable threshing cylinder, a closed concave substantially concentric with the cylinder and disposed generally adjacent to the lower rear portion thereof, and guide means extending tangentially upwardly and forwardly from said closed concave, said cylinder and concave being cooperable to receive crop material and dislodge the grain therefrom, and said cylinder being operable to discharge the resulting mat of threshed crop material upwardly and forwardly along said guide means; a first separating unit mounted between said support means above said threshing unit and including a first separating impeller rotatable in a direction opposite that of said threshing cylinder, a first open concave concentric with and spaced radially outwardly from the forward portion of said impeller, and first guide means extending downwardly and rearwardly from the terminal edge of said first open concave, said first impeller being operable to engage the mat of crop material discharged from the threshing unit and impart a velocity thereto having a radial outward component relative to said first open concave, whereby grain on the radial outer side of the mat is positively discharged through the first open concave to effect separation of a portion of the grain from the mat, and the mat including the remaining grain is discharged downwardly and rearwardly along said first guide means; a second separating unit mounted between said support means rearwardly of said first unit and including a second separating impeller rotatable in a direction opposite that of said first impeller, a second open concave concentric with and spaced radially outwardly from the lower rear portion of said second impeller, and second guide means extending upwardly and forwardly from the terminal edge of said second open concave, said second impeller being operable to engage the mat of crop material discharged from the first separating unit and impart a velocity thereto having a radial outward component relative to said second open concave, whereby grain on the radial outer side of the mat is positively discharged through the second open concave to effect separation of a further portion of the grain from the mat, and the mat including the remaining grain is discharged upwardly and forwardly along said second guide means; and a third separating unit mounted between said support means above said second separating unit and including a third separating impeller rotatable in a direction opposite that of said second impeller, a third open concave concentric with and spaced radially outwardly from the forward portion of said third impeller, and third guide means extending downwardly and rearwardly from the terminal edge of said third open concave, said third impeller being operable to engage the mat of crop material discharged from the second separating unit and impart a velocity thereto having a radial outward component relative to said third open concave, whereby grain on the radial outer side of the mat is positively discharged through the third open concave to effect separation of yet a further portion of the grain from the mat, and the mat is discharged downwardly and rearwardly along said third guide means.

* * * * *